United States Patent
Udriste et al.

(10) Patent No.: US 10,315,770 B2
(45) Date of Patent: Jun. 11, 2019

(54) WIRELESS CONTROL SYSTEMS AND METHODS FOR AIRCRAFT SEATING SYSTEMS

(71) Applicant: B/E Aerospace, Inc., Wellington, FL (US)

(72) Inventors: Daniel I. Udriste, Coral Springs, FL (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 311 days.

(21) Appl. No.: 15/472,355

(22) Filed: Mar. 29, 2017

(65) Prior Publication Data

US 2017/0283068 A1  Oct. 5, 2017

Related U.S. Application Data

(60) Provisional application No. 62/316,833, filed on Apr. 1, 2016.

(51) Int. Cl.
*B64D 11/06* (2006.01)
*H04W 4/80* (2018.01)
*G08C 17/02* (2006.01)

(52) U.S. Cl.
CPC .......... *B64D 11/0639* (2014.12); *G08C 17/02* (2013.01); *H04W 4/80* (2018.02)

(58) Field of Classification Search
CPC ... B64D 11/0639; B64D 11/064; B64D 11/06; B64D 11/06395; B64D 11/0641; B64D 11/0601; B64D 11/0696; B64D 11/606; G08C 17/02; H04W 4/80
See application file for complete search history.

(56) References Cited

U.S. PATENT DOCUMENTS

| | | | |
|---|---|---|---|
| 6,731,088 B2* | 5/2004 | Nivet | B60N 2/0244 318/548 |
| 8,457,846 B2* | 6/2013 | Fischer | B60N 2/0224 701/36 |
| 2003/0098661 A1* | 5/2003 | Stewart-Smith | B60N 2/0244 318/445 |
| 2011/0107377 A1* | 5/2011 | Petrisor | H04L 12/40182 725/76 |
| 2017/0282755 A1* | 10/2017 | Gordiet | B60Q 3/233 |
| 2018/0118055 A1* | 5/2018 | Schlosser | B60N 2/0228 |
| 2018/0290753 A1* | 10/2018 | Gledich | B64D 11/0639 |

* cited by examiner

*Primary Examiner* — Valentina Xavier
(74) *Attorney, Agent, or Firm* — Clements Bernard Walker PLLC

(57) ABSTRACT

In an illustrative embodiment, electromechanical actuation systems and methods for use in an aircraft passenger suite include aircraft suite actuators for allowing passenger-initiated adjustment of a passenger seat and other suite components, a LRU coupled to each of actuators including control circuitry for controlling actuation of a given actuator in response to a passenger-initiated adjustment request, and wireless communication circuitry configured to: initiate communication links with LRUs creating a communication network, establish master/slave relationships with LRUs, and communicate actuation commands via the communication network.

20 Claims, 14 Drawing Sheets

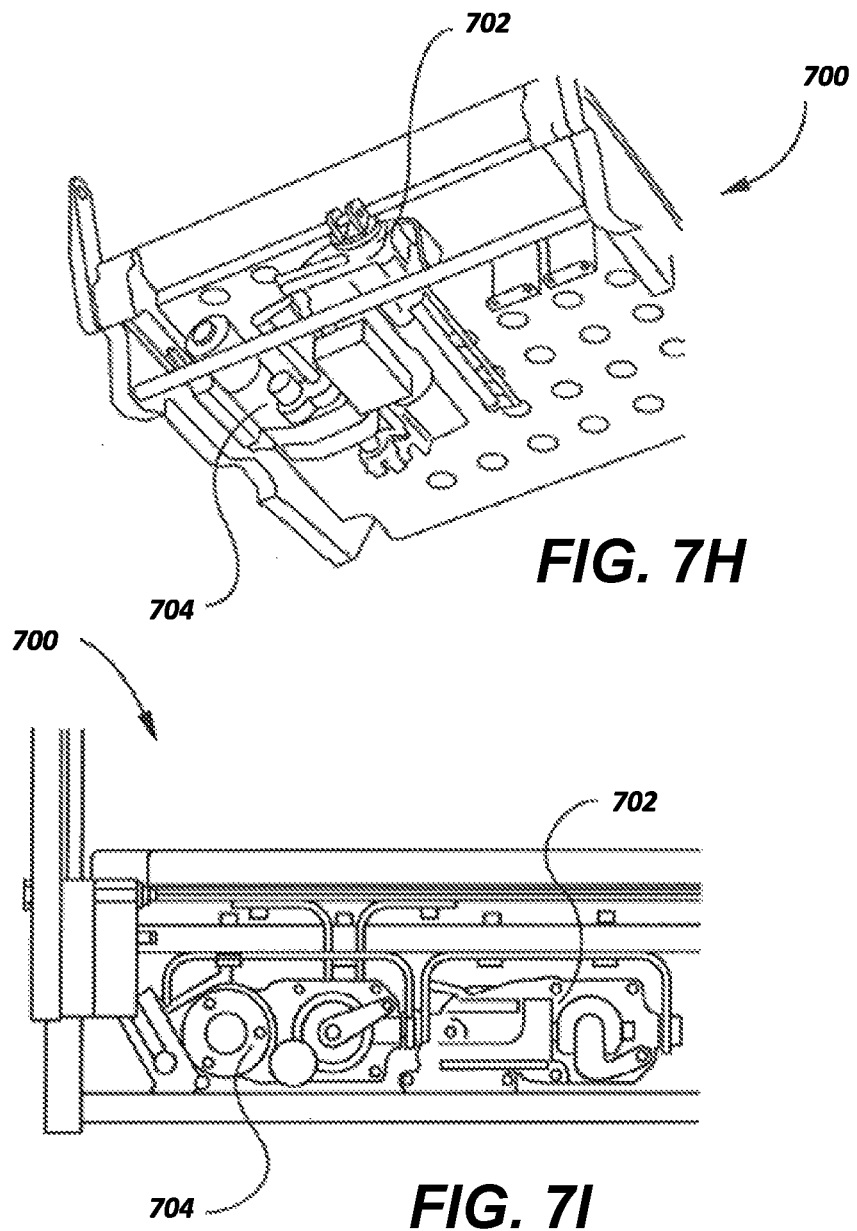

WIRELESS CONTROL SYSTEMS AND METHODS FOR AIRCRAFT SEATING SYSTEMS

RELATED APPLICATIONS

This application claims priority to U.S. Provisional Patent Application Ser. No. 62/316,833, entitled "Actuation System for Aircraft Seating Systems Using Bluetooth Wireless Communication," filed Apr. 1, 2016. This application is related to the following patent: U.S. Pat. No. 9,193,465, entitled "Electromechanical Actuation System for Aircraft Passenger Suites and Method," filed Nov. 8, 2012 and issued Nov. 24, 2015. All above identified applications are hereby incorporated by reference in their entireties.

BACKGROUND

The present disclosure is directed to controlling subcomponents which are part of an aircraft seat and/or suite actuation system that can include components that respond to passenger-initiated operations related to manipulation of an aircraft seat and related comfort accessories and devices. These system components include but are not limited to actuators, controls, lights, solenoids, power supply units, electronic control units, auxiliary electronic boxes, connection boxes and electrical peripherals.

In aircraft seat design, weight is an important consideration that can often limit the design flexibility of the seat/suite because the necessary electromechanical components needed to implement the functionality or automation along with the complex wiring systems connecting the components may increase the weight of the aircraft seat over predetermined limits. For example, a seat control unit (SCU) can transmit passenger-initiated command signals to a series of seat actuators, lighting fixtures, comfort/massage devices (etc.), collectively referred to as line replacement units (LRUs), within the passenger seat. In some examples, the SCU and the LRUs are interconnected in a series or daisy chain arrangement by a data bus (e.g., CANBUS) that allows the LRUs to communicate with one another. Any of the LRUs can include an electronic control unit (ECU) and serve as a primary controller for the other LRUs in the suite. The data bus wiring along with power wiring and associated electromagnetic interference (EMI) shielding can result in complex wiring configurations within the space-limited passenger seat that can be confusing to identify as well as increased weight due to the wiring and processing components (e.g., ECUs) installed in the LRUs. In addition, troubleshooting issues with the LRUs can be a difficult and complex process due to the wiring density within the passenger suite along with the electronic complexity of the LRUs.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an electromechanical actuation systems for aircraft passenger suites using short range wireless communication includes aircraft suite actuators that allow passenger-initiated adjustment of a passenger seat and associated passenger suite components. Each of the aircraft suite actuators may include a line replacement unit (LRU) that has a controller configured to control actuation of its corresponding actuator in response to a passenger-initiated adjustment request as well as a short range communication device that is configured to initiate wireless short range communication links with other LRUs within the aircraft suite, creating a wireless communication network that connects the LRUs. Master-slave relationships are established between the LRUs within the wireless communication network to facilitate communication of actuation commands that correspond to the passenger-initiated adjustment request. In some implementations, the master device has unidirectional control over multiple slave devices within the wireless communication network. In some implementations, short range wireless communication is provided through Bluetooth wireless communication technology. In other embodiments, Ultra Wide Band (UWB) or ZigBee wireless communications may be used. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used.

In certain embodiments, the wireless communication network connecting the short range wireless communication-enabled LRUs of the electromechanical actuation system is a Bluetooth Personal Area Network (PAN) or PICONET network in which a master device is connected to up to seven slave devices. In other embodiments, the wireless communication network can be expanded to include more than eight total LRUs by organizing the LRUs into a scatternet having multiple PANs or PICONETs that are connected by bridge LRUs that communicate within multiple PANs of the scatternet. In certain embodiments, the LRUs are grouped into PANs or PICONETs within the scatternet based on various factors that can include time of device connection, physical location within the aircraft suite, frequency interference between Bluetooth-enabled devices, and function associated with the LRUs.

In certain embodiments, the wireless communication network connecting the short range wireless communication-enabled LRUs of the electromechanical actuation system is a Zigbee star or mesh topology network in which a coordinator is connected to multiple endpoint devices. In other embodiments, the wireless communication network can be expanded to include additional LRUs by organizing the LRUs into a cluster configuration having multiple star or mesh topologies that are connected by bridge LRUs that communicate within multiple star or mesh topologies within the cluster. In certain embodiments, the LRUs are grouped into star or mesh topologies within the cluster based on various factors that can include time of device connection, physical location within the aircraft suite, frequency interference, and function associated with the LRUs.

In certain embodiments, the wireless communication network connecting the short range wireless communication-enabled LRUs of the electromechanical actuation system is a UWB or other type of peer-to-peer network where any LRU can communicate with any other peer LRU within the wireless communication network. In certain embodiments, the peer-to-peer connections between LRUs allow for multiple LRUs to function as master devices in sub-processes associated with movement of an aircraft suite. In embodiments, the peer-to-peer network topology may also be expanded into a mesh topology in upper network layers from the peer-to-peer toplogy.

In certain embodiments, in response to a passenger-initiated adjustment request at a seat control unit (SCU), the master device within the wireless communication network outputs motion commands to each of the connected LRUs associated with the request. In some implementations, the master device within the wireless communication network is a seat control module (SCM) that includes an electronic control unit (ECU). As the actuators associated with the LRUs begin to move or take action to fulfill the adjustment request, the LRUs transmit intermediate status/position messages to the master device so that the master device can inform LRUs whose actions are dependent upon the positions of other LRUs.

In certain embodiments, the wireless communication network can be a scatternet connecting LRUs of multiple passenger suites, such as in the case of passenger suites share a center privacy panel that is controllable by both passengers. By configuring the scatternet to include LRUs from both passenger suites, conflicting requests to manipulate the shared privacy panel can be avoided.

Benefits of the embodiments described herein include a reduction in wiring complexity due to an elimination in the need for hardwire data cables connecting the short range wireless communications-enabled LRUs such that the short range wireless communications-enabled LRUs are only connected by 2-wire power cabling. The reduction in wiring complexity provides for ease of troubleshooting as well as a reduction on an impact of aircraft weight restrictions on the number and type of aircraft suite automation capabilities that can be offered to passengers. The overall weight of the passenger suites can also be reduced Benefits offered by the embodiments described herein also include data network adaptability due to the flexibility of the configuration of the wireless communication network. By organizing the short range wireless communications-enabled LRUs into groupings that can be expanded into interconnected networks based on functional characteristics and other properties of the actuators, shared components between passengers, location of the actuators within the aircraft compartment, frequency interference between the LRUs, and time of connection of the LRUs to the wireless communication network, the electromechanical actuation system becomes highly adaptable to changing conditions within the aircraft suite as well as within the aircraft cabin as a whole.

Benefits offered by the embodiments described herein also include improved diagnosis of problems due to malfunctioning components within the aircraft suites. The wireless communication network connecting the short range wireless communications-enabled LRUs improves the ability to diagnose problems with the components of the electromechanical actuation system due to the ease of transmitting data messages to a diagnostic system via the wireless communication link.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 7B-7K illustrate views of exemplary actuators installed in an aircraft seat;

DETAILED DESCRIPTION OF ILLUSTRATIVE EMBODIMENTS

Figure 1:
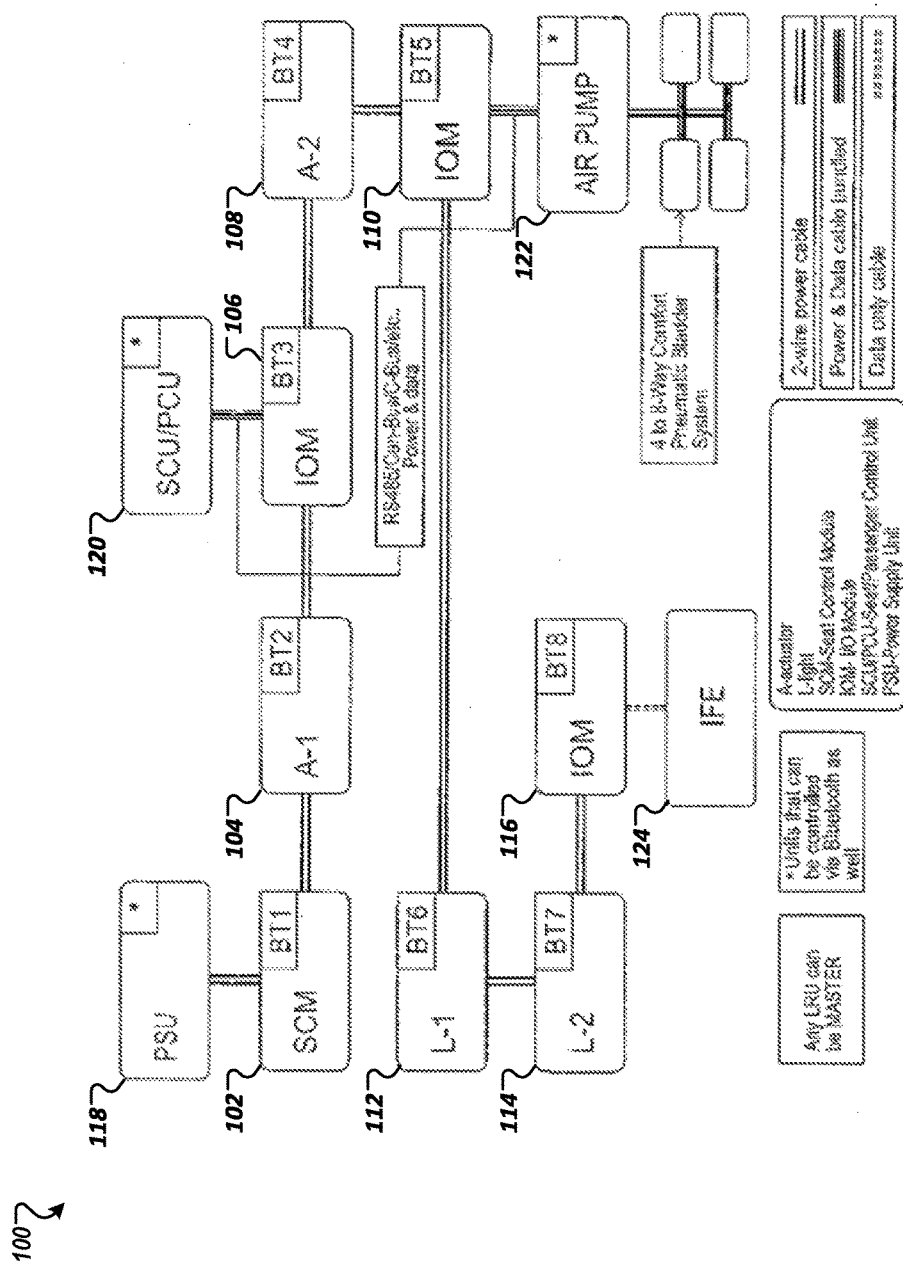
FIG. 1 illustrates an exemplary schematic of an electromechanical actuation system for an aircraft passenger seat that includes short range wireless communications-enabled line replacement units (LRUs)

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to the use of wireless technology as a means of controlling subcomponents which are part of an aircraft seat and/or suite actuation system that can include components that respond to passenger-initiated operations related to manipulation of an aircraft seat and related comfort accessories and devices. Implementations described further herein include a method to communicate and transfer data through a wireless technology network from a remote controller to line replacement units (LRUs) that include circuitry for controlling electromechanical actuation of components in the aircraft suite, which can include seat actuators, lighting, comfort component actuators, in-flight entertainment (IFE) modules, etc.

In a preferred embodiment, the short range wireless communications technology is Bluetooth technology. Bluetooth technology is a cable-replacement technology that provides for exchanging data over short distances between multitudes of devices. Bluetooth is a wireless technology standard for exchanging data over short distances using short-wavelength UHF radio waves in the industrial, scientific, and medical (ISM) band from 2.4 to 2.485 GHz from fixed and mobile devices, and building personal area networks (PANs). Bluetooth was originally conceived as a wireless alternative to RS-232 data cables and can connect several devices, overcoming problems of synchronization. While many of the examples are described in relation to preferred embodiment configurations utilizing Bluetooth technology, it may be understood that, in other embodiments, a different short range wireless communication technology, such as ZigBee or UWB, may be readily substituted while following the same general teachings and network communications distribution.

According to some implementations described further herein, the communication wire connections between LRU's may be eliminated by integrating short range wireless communications devices (e.g., transmitters, receivers, and associated circuitry) into the LRUs, leaving only 2-wire power connections with appropriate shielding and grounding between LRUs. Data is communicated wirelessly between the Bluetooth devices of the LRUs, which provides a net result of a lighter-weight, less complex wiring system.

Bluetooth technology provides for connecting up to eight devices simultaneously using a technique called spread-spectrum frequency hopping. In some implementations, spread-spectrum frequency hopping is a method of transmitting radio signals by rapidly switching a carrier among many frequency channels using a pseudorandom sequence known to both transmitter and receiver. When Bluetooth-capable devices come within range of one another, data messaging occurs between the devices to determine which device will function as a master device and which devices will function as slave devices. Once the data messaging conversation has occurred, the devices form a small ad-hoc network referred to as a PAN or PICONET. References to PAN and PICONET can be made interchangeably throughout the disclosure. Once a PAN is established, the members can randomly hop frequencies in unison so the devices can stay in touch with one another and avoid other PAN's that may be operating in the same area. Aspects of the present disclosure are directed to configuring a PAN for Bluetooth-enabled LRUs where any LRU can operate as a master device or a slave device within the PAN. Aspects of the present disclosure are also directed to configuring a scatter-net that includes multiple PANs of interconnected Bluetooth-enabled LRUs that allow for greater than eight Bluetooth-enabled LRUs to communicate with one another simultaneously.

FIG. 1 illustrates an exemplary schematic of an electromechanical actuation system 100 for an aircraft passenger suite that includes Bluetooth-enabled LRUs and other control units and components of the aircraft suite. An aircraft suite commonly refers to a first or business class passenger seating module that includes the seat, privacy panels, storage consoles, entertainment components, lighting, comfort components, or the like. Throughout the disclosure, references to an aircraft seat and an aircraft suite can be used interchangeably.

Figure 4:
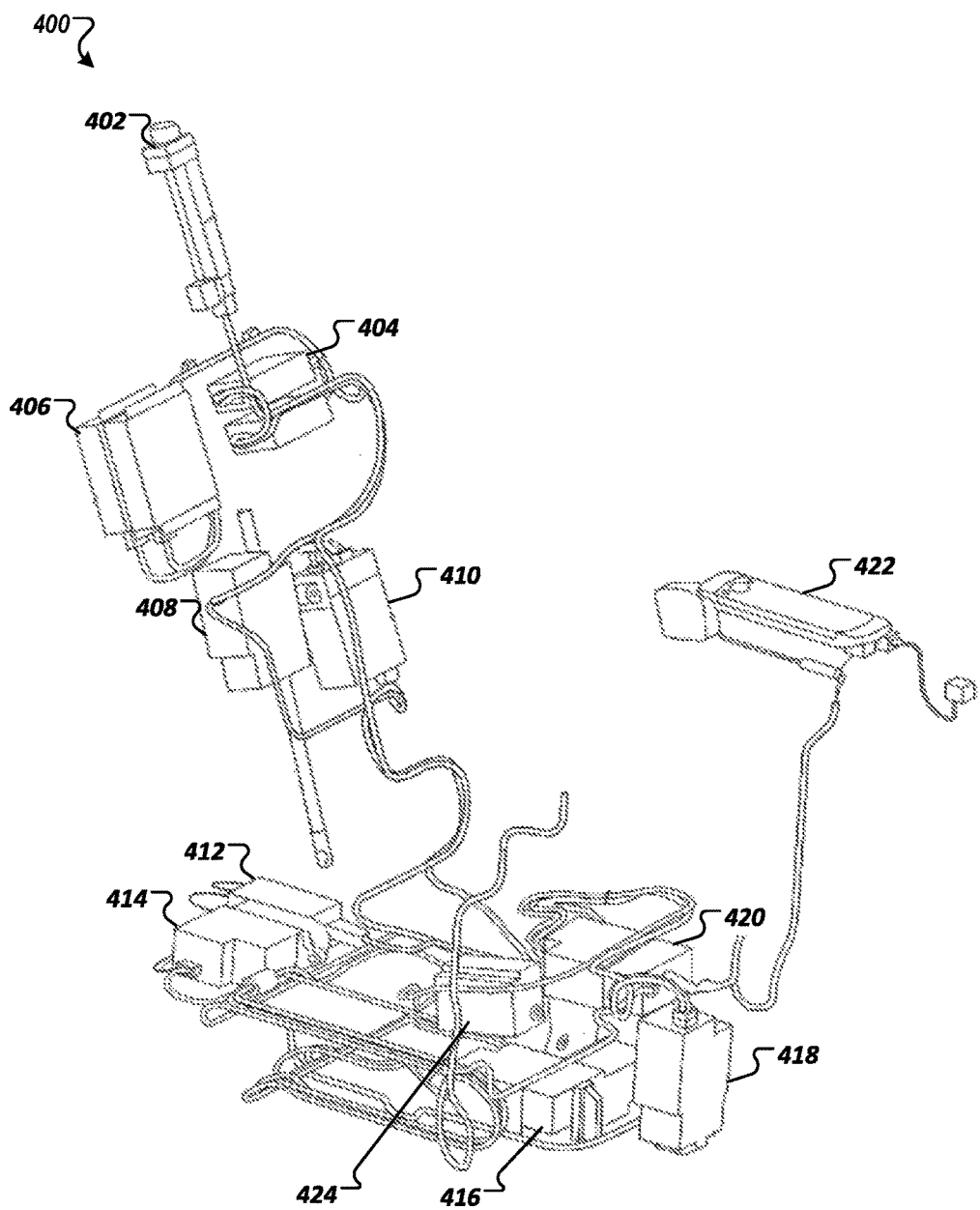
FIG. 4 illustrates an exemplary network of short range wireless communications-enabled actuators for an aircraft suite connected by 2-wire power cables.

The system 100 includes various types of electrical connections between the LRUs and other components including 2-wire power cable connections, bundled power and data cable connections, and data only cable connections. The LRUs of the system 100 can include actuators 104 and 108, which may be electromechanical actuators for automated mechanical components, such as seat, armrest, or privacy panel components. In one example, the actuator 104 is a seat pan translation actuator, and actuator 108 is a seat back recline actuator, however the system 100 can also include other seat actuators than those shown in FIG. 1. For example, FIG. 4 is an illustrative example of aircraft seat LRUs 400 interconnected by 2-wire power cables that can be installed in aircraft seat 700 shown in FIG. 7A. The aircraft seat LRUs can include seat actuators such as a headrest actuator 402, a seat reclining actuator 408, an armrest actuator 410, seat pan translation actuators 420 and 424, a seat pan actuator 416, and a footrest actuator 418. The system 100 can also include other LRUs and actuators for other seat configurations than those shown in FIG. 4.

Referring back to FIG. 1, the system 100 can also include lighting actuator LRUs 112 and 114 that control lights within an aircraft suite in response to a passenger input received at input/output module (IOM) 116 via in-flight entertainment (IFE) module 124, which may be a touchscreen or other input device. The system 100 may also include comfort component actuators such as air pump 122 that can control an amount of air supplied to a pneumatic bladder system that provides seat back lumbar support in response to a passenger input at input/output module (IOM) 110. As an illustrative example, air pump 406 (FIG. 4) controls an amount of air supplied to a pneumatic bladder system that provides seat back lumbar support in response to a passenger input at input/output module (IOM) 404.

Referring back to FIG. 1, other types of LRUs may also be included that provide power and control for the system 100. The system 100 includes a power supply unit (PSU) 118 that provides power to the other system components via the 2-wire power cable connections interconnecting the various components. For example, the PSU 118 is directly connected to a seat control module (SCM) 102 as shown in FIG. 4 with respect to SCM 412 and PSU 414. In some implementations, each LRU of the system 100 that includes an electronic control unit (ECU) with a processor can be referred to as a SCM. In some examples, each of the LRUs of the system 100 include ECUs and/or processors and associated circuitry that provide for controlling the actuators associated with the LRUs. An aircraft suite can include a single SCM as shown in the system 100, or two or more of the suite's LRUs can be configured as SCMs. Each SCM can be configured and programmed to receive control commands from seat control unit (SCU) 120 via input/output module (TOM) 106, and in response to such commands, sends control signals to each of the system LRU's to initiate a requested response. In one example, the SCU 120 is an armrest control unit where the passenger can adjust an amount of recline of the seat back, which may include moving the seat between an upright, taxi, take-off and landing (TTOL) position and a lie-flat position. For example, armrest control unit 422 (FIG. 4) includes an integrated SCU and IOM. When an aircraft suite includes more than one SCM, each SCM can be configured to assume control of the suite's LRUs if the original controlling SCM 102 becomes inoperative.

Figure 2:
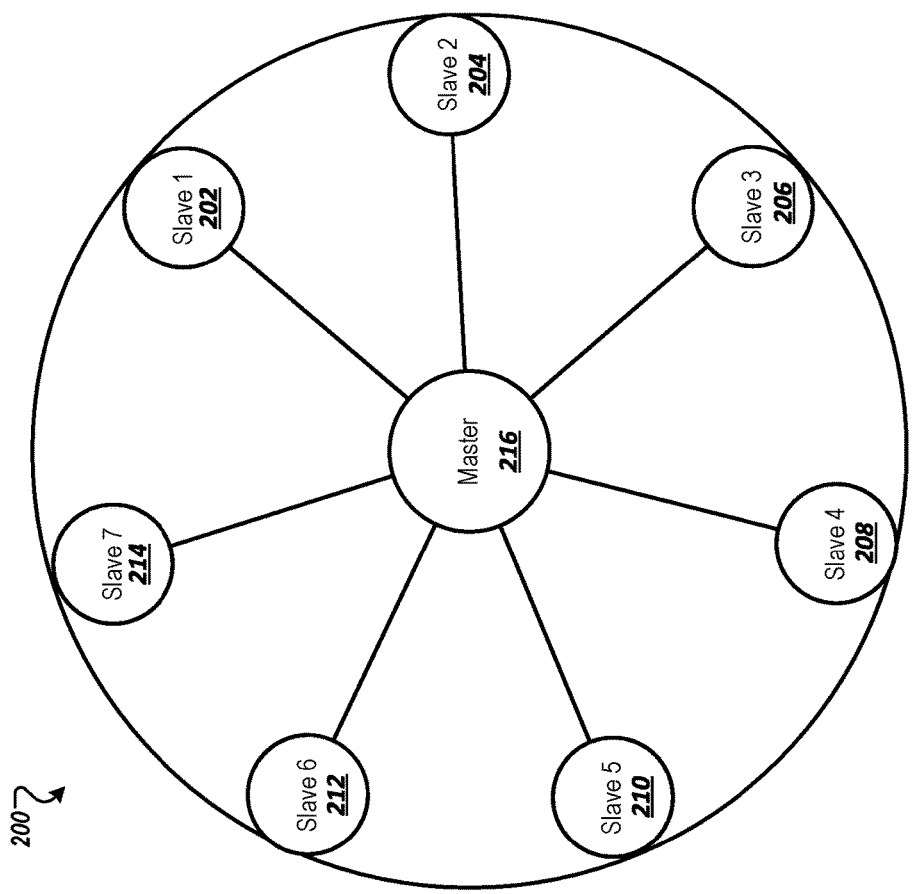
FIG. 2 illustrates an exemplary diagram of a small ad-hoc Bluetooth Personal Area Network (PAN) or PICONET network.

In some implementations, the LRUs of the system 100 can be Bluetooth-enabled, meaning that the LRUs include Bluetooth communication devices that can be configured to communicate with other Bluetooth-enabled devices within a PAN or PICONET. For example, a PAN of eight Bluetooth-enabled LRUs of the system can include SCM 102, seat actuators 104 and 108, IOMs 106, 110, and 116, and lighting actuators 112 and 114 can communicate with one another simultaneously to exchange data. As an illustrative example, FIG. 2 is a diagram of a PAN 200 having a master device 216 connected to seven slave devices 202-214 via Bluetooth connection that are synchronized to the same frequency hopping pattern. Each of the devices 202-216 can represent one of the Bluetooth-enabled LRUs 102-116 of the system 100. The master device 216 has unidirectional control of the slave devices 202-214, and the master/slave roles of the devices can be exchanged between devices 202-216 based on various factors. For example, the master device 216 controls both Bluetooth communication messaging between devices as well as actuation of the actuators or other controllers associated with the LRUs.

When initial Bluetooth connections are established between the devices 202-216, a default master device 216 may assume initial control of the other devices 202-214 in the PAN 200 before master/slave role exchanges can be performed. In one example, the SCM 102 or another LRU with an ECU may be configured as the default master device 216 of the system 100, but any of the LRUs may be configured as the default master device 216 in the PAN 200. In some implementations, the data exchanged between the Bluetooth-enabled LRUs can include synchronization commands that provide for synchronizing the LRUs on a predetermined frequency hopping sequence, master/slave negotiation messages that provide for establishing master-slave relationships between the LRUs within the PAN, and control commands for the seat actuators 104 and 108 and lighting actuators 112 and 114. In addition, the master/slave functionality can be exchanged between devices 202-216 in the PAN 200 based on various factors that can include detection of a malfunction of the master device 216, reconfiguration of the PAN 200 to add or remove devices based on establishment of a scatternet, assignment of one of the devices to another PAN, or addition of additional devices to the PAN 200.

In some implementations, the master device 216 may also be responsible for receiving periodic actuator status messages from each of the slave devices 202-214 within the PAN 200 that can in turn be transmitted to a Bluetooth-enabled aircraft component diagnostic system that is responsible for detecting errors or malfunctions that may happen to various aircraft components. For example, the master device 216 can transmit periodic aircraft suite status messages to the diagnostic system via a Bluetooth link indicating a health and overall status of the actuators associated with the LRUs in the PAN 200 as well as case by case status messages indicating when a malfunction or failure of an aircraft component is detected.

Referring back to FIG. 1, in addition to the Bluetooth-enabled devices that make up the PAN, the system 100 may also include additional Bluetooth-enabled devices that provide system redundancy and can be added to the PAN if one of the other Bluetooth-enabled devices is unable to perform Bluetooth communications due to failure of the installed Bluetooth device. For example, PSU 118, SCU 120, and air pump 122 can also be configured to perform Bluetooth communications. In some implementations, the additional Bluetooth-enabled devices can be configured to establish a scatternet with the other LRUs in the PAN so that greater than eight devices can communicate with one another simultaneously. The system 100 can also include additional actuators than those shown in FIG. 1, which can be incorporated into the scatternet.

Figure 3:
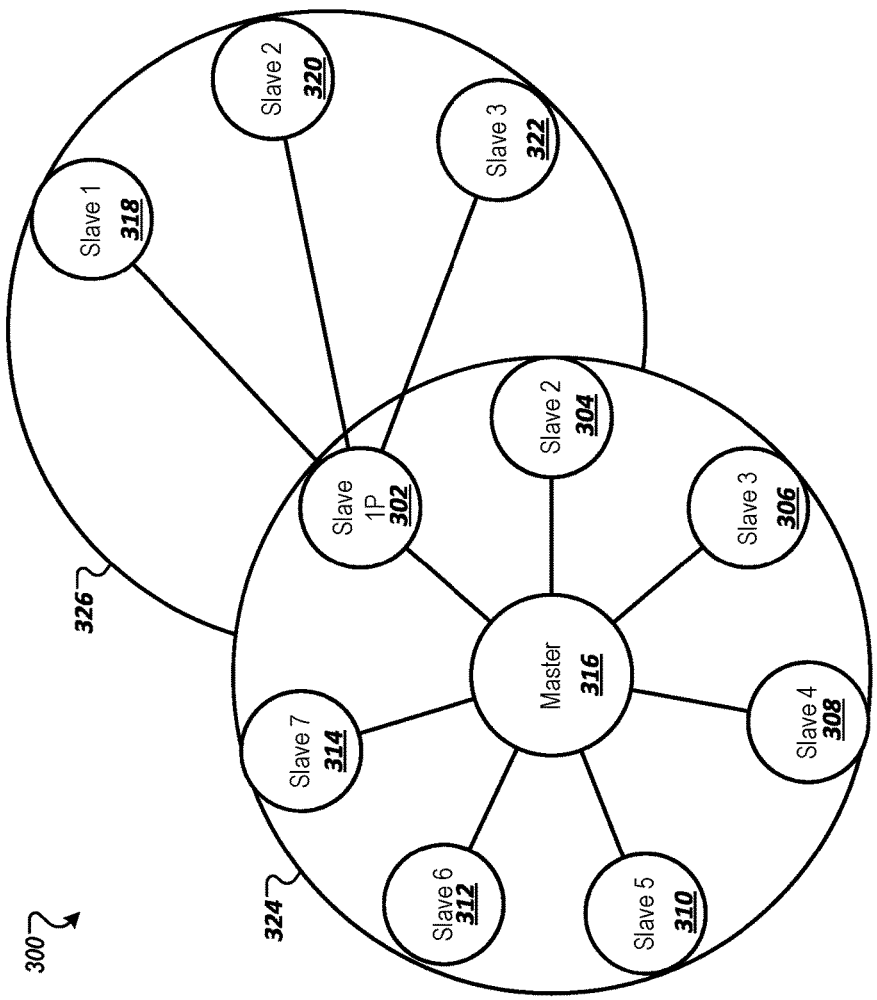
FIG. 3 illustrates an exemplary diagram of a Bluetooth scatternet.

A scatternet is a network of multiple PANs where at least one device acts as a bridge connecting the PANs so that more than eight devices can perform Bluetooth communications with one another simultaneously. The bridge device can be referred to as a parking Bluetooth device, and can be a slave device in one PAN and either a master or a slave device in another PAN of the scatternet. For example, FIG. 3 is an exemplary diagram of a scatternet 300 made up of two PANs 324 and 326 having a total of eleven devices 302-322 that can communicate with each other simultaneously via parking device 302 (Slave 1P), which is a part of both PANs 324 and 326. In some implementations, the parking device 302 can function as a slave device in the PAN 324 and a master device in the PAN 326. However, the parking device 302 can also function as a slave device in the PAN 326 while one of the other devices 318, 320, or 322 functions as the master device for the PAN 326. The parking device 302 relays data messages between the master device 216 of the PAN 324 and the other devices 318-322 of the PAN 326 so that the devices 302-322 can exchange data seamlessly even though the devices 326 are not a part of the PAN 324 and may be communicating with a different frequency hopping scheme than the devices of the PAN 324. The parking device 302 communicates with the master device 216 via a first frequency hopping scheme and with the other devices 318-322 of the PAN 326 via a second frequency hopping scheme.

In the example of the system 100, each of the devices 302-316 in the PAN 324 can represent one of the Bluetooth-enabled LRUs 102-116 of the system 100, and the devices 318-322 in the PAN 326 can represent one of the Bluetooth-enabled LRUs 118-122 in the system 100. In addition, the SCM 102 can function as the master device 316 of the PAN 324, which can also function as an overall master device for the scatternet 300 that controls data messaging, PAN assignments, and operation of the LRUs of the system 100. The master device 216 can assign any of the Bluetooth-enabled devices 302-314 as the parking device 302 that relays messages between the master device 316 and the devices 318-322 of the PAN 326. In some implementations, master device 316 selects the parking device 302 as any one of the LRUs in the system 100 that is configured with an ECU as part of the device. In one example, one of the IOMs 106, 110, or 116 is assigned as the parking device 302, but any of the seat actuators 104 or 108, lighting modules 112 or 114, or any other Bluetooth-enabled device in the system 100 can be assigned as the parking device 302.

In some implementations, assignment of devices to the PANs 324 and 326 within the scatternet 300 can be based on a variety of factors or priorities. The Bluetooth-enabled LRUs of the system 100 may be organized into a scatternet 300 having two or more interconnected PANs based on time of connection, physical location of the LRUs within the aircraft suite, frequency interference between the LRUs of one aircraft suite and the LRUs of another aircraft suite, or function of the LRUs. For example, with a time of connection criteria, a default master device connects to one or more default slave devices upon device initialization, and any additional devices are added to the PAN or scatternet 300 upon detection by the master device 316. In some implementations, upon power up or initialization, a device can transmit a connection request to the master device 316 to join the scatternet 300, and the master device 316 processes the requests in order of receipt. Once the slave device slots have been filled for the PANs 324 and 326, the master device 316 may establish another PAN within the scatternet for connecting any additional incoming devices.

In certain embodiments, the PANs 324 and 326 of the scatternet 300 may be organized based on a physical location of the devices 302-322 within the scatternet 300. For example, aircraft seat actuators located in or in close proximity to a seat back (e.g., recline actuator, armrest actuators, air pump actuators) may be organized into one PAN 324 or 326 of the scatternet while aircraft seat actuators located in close proximity to a seat (e.g., seat pan actuators, translation actuators, footrest actuators) may be organized into another PAN 324 or 326 of the scatternet 300. The PANs 324 and 326 may also be organized based on frequency interference between the LRUs of one aircraft suite and the LRUs of another aircraft suite. For example, some of the LRUs of the PAN 324 or 326 may experience interference with LRUs of another aircraft suite or other Bluetooth devices within the aircraft based on frequency hopping schemes of the other devices, locations of the devices relative to the LRUs, and the like. The LRUs that experience the frequency interference may be organized into a separate PAN with a frequency hopping scheme that is not affected by the previously experienced interference. Also, the LRUs of the system 100 may be organized into PANs 324 and 326 based on the type of function associated with the LRUs. For example, seat actuators and their associated IOMs may be organized into one PAN 324 or 326 while lighting LRUs and their associated IOMs may be organized into another PAN 324 or 326.

In some examples, LRUs associated with multiple aircraft suites can be connected to one each other in a single scatternet where at least one PAN of the scatternet corresponds to the LRUs for a particular aircraft suite. For example, the LRUs for seats in a row where each of the seats shares at least one privacy panel or armrest with another seat, actuators for the shared privacy panels can function as the parking devices connecting the PANs of a scatternet, where at least one of the PANs is associated with each seat that shares at least one privacy panel with another seat in the row.

Figure 5:
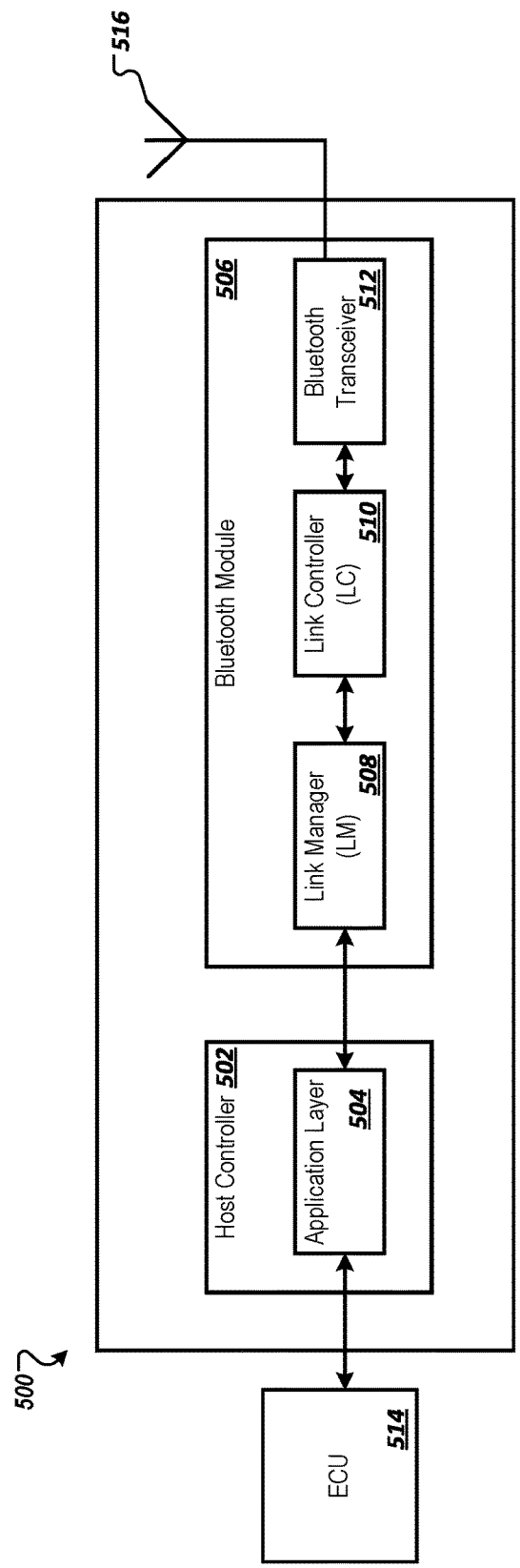
FIG. 5 illustrates an exemplary block diagram of a Bluetooth communication device installed in LRUs of an aircraft passenger suite.

Turning to FIG. 5, an exemplary block diagram of a Bluetooth communication device 500 installed each of the Bluetooth-enabled LRUs of an aircraft passenger suite is described. In LRUs that include an ECU 514, a host controller 502 of the device 500 communicates with processing circuitry of the ECU 514 to receive instructions to transmit to the other LRUs of the system 100 via Bluetooth messaging and passes on received messages from the other LRUs to the ECU 514. The host controller 502 also includes a software application layer 504 that translates instructions generated by the host controller 502 into a format compatible with Bluetooth module 506, sends the commands from the host controller 502 to a link manager (LM) 508 of the Bluetooth module 506, and processes data received from the Bluetooth module 506. For example, if the Bluetooth device 500 is part of a LRU operating as a slave device in a PAN or scatternet, in response to detecting that an associated seat actuator has moved to a predetermined position, the host controller 502 may generate a Bluetooth message to the master device in the PAN or scatternet that the actuator has reached the predetermined position. If the Bluetooth device 500 is associated with a LRU functioning as a master device in a PAN or scatternet, the host controller 502 receives Bluetooth connection commands as well as actuator movement commands from the ECU 514 and translates those commands into a format compatible with the Bluetooth module 506.

The Bluetooth module 506 sends and receives data messages to other connected devices of the PAN or scatternet in response to commands received from the host controller 502. The LM 508 is a software module that programs performance of link controller (LC) 510, controls setup of the communication link for the LRU in which the device 500 is installed, discriminates between different types of signals, and performs other tasks to control operation of the Bluetooth module 506. In some implementations, the LC 510 controls the operation of Bluetooth transceiver 512 to coordinate the sending and receiving of data messages via antenna 516. For example, the LC 510 may configure operational modes of the transceiver 512, process data messages received from the transceiver 512, and transmit data messages destined for transmission to another device to the transceiver 512. The transceiver 512 includes transmitter and receiver RF front ends and associated circuitry that allows the transceiver 512 to both transmit and receive Bluetooth signals from other devices via the antenna 516. For example, the transceiver 512 may include both hardware and software components that provide for coordination of signal transmission and reception at the transceiver 512. In some implementations, the device 500 may include separated transmitter and receiver circuits that are not integrated as a single transceiver. The description of the Bluetooth communication device 500 is not limiting, and the device 500 can include additional or alternative components than those described herein.

Figure 6:
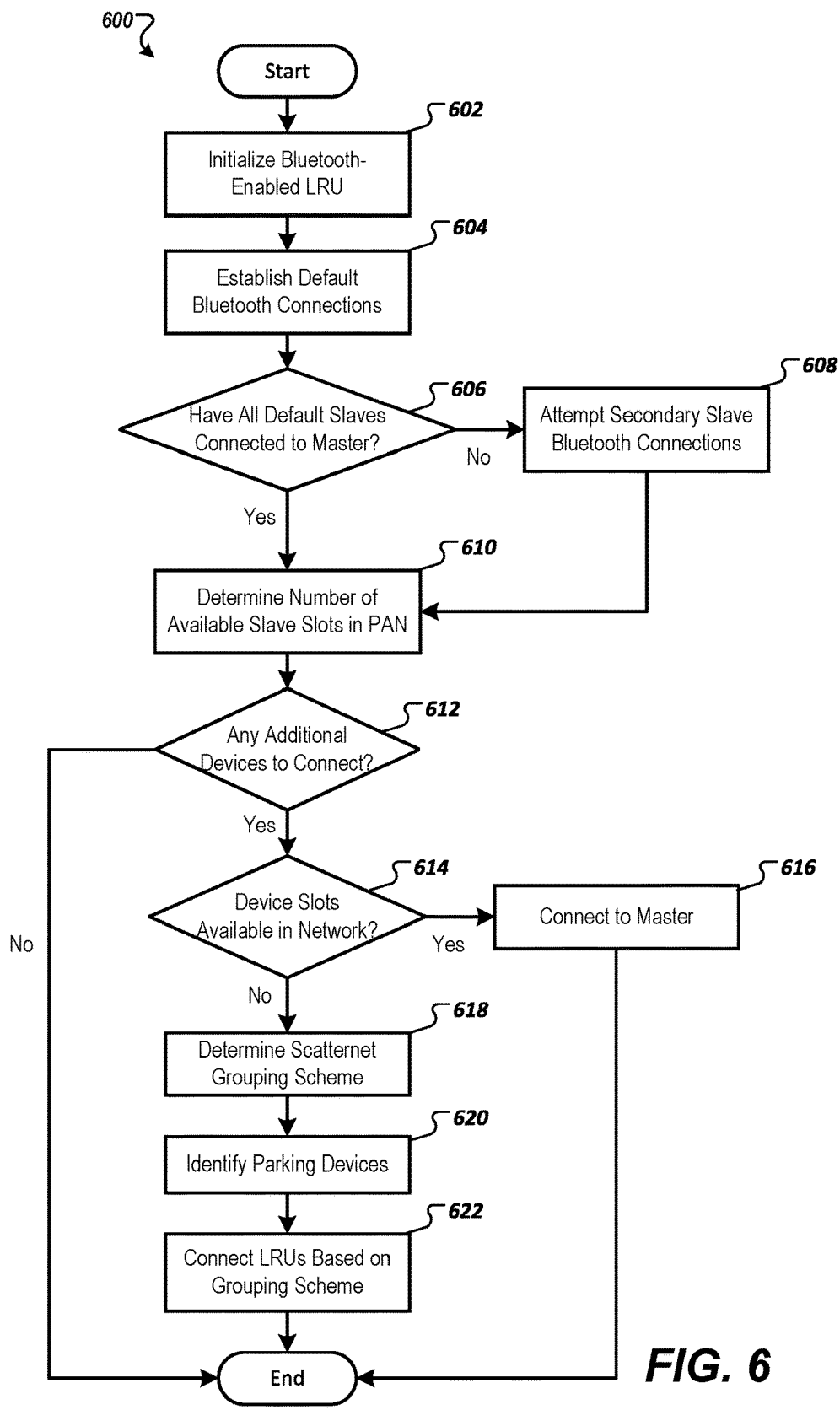
FIG. 6 illustrates an exemplary flow diagram of a method for connecting a network of Bluetooth-enabled LRUs in an aircraft passenger suite.

FIG. 6 illustrates an exemplary flow diagram of a method 600 for connecting a network of Bluetooth-enabled LRUs in an aircraft passenger suite, according to some embodiments of the present disclosure. The description for the flow diagram illustrates a particular ordering of processes, steps, and decisions, but it can be understood that the steps of the processes can be performed in a different order, and some steps may not be performed in certain embodiments. Additionally, certain steps of the flow diagram, in other embodiments, may be performed in parallel.

In some implementations, the method 600 begins with initialization of one or more Bluetooth-enabled LRUs in an aircraft passenger suite, such as any of the LRUs associated with the devices 102-122 of the system 100 of FIG. 1 (602). In some examples, initialization of the LRUs may include powering on the LRUs and integrated Bluetooth device (e.g., Bluetooth communication device 500 in FIG. 5) or waking the LRUs and integrated Bluetooth device from a sleep mode or state.

In response to initialization of the Bluetooth-enabled LRUs, in some implementations, the LRUs may attempt to establish default Bluetooth connections with one another based on predetermined default master/slave relationships of the LRUs (604). For example, when initial Bluetooth connections are established between the devices 202-216 of the PAN 200 (FIG. 2), a default master device 216 may assume initial control of the other devices 202-214 in the PAN 200 before master/slave role exchanges can be performed. In one example, the SCM 102 or another LRU with an ECU may be configured as the default master device 216 of the system 100, but any of the LRUs may be configured as the default master device 216 in the PAN 200. In addition, in some examples, the default slave devices 202-214 may include up to seven Bluetooth-enabled aircraft seat actuators, lighting or comfort actuators, IOMs, or other associated Bluetooth-enabled devices within the aircraft passenger suite although any of the Bluetooth-enabled devices in the PAN 200 may operate as the master device 216 or the slave devices 202-214. If the system includes more than eight total default devices, then the initial Bluetooth connections may be established as a scatternet such as scatternet 300 (FIG. 3) that includes multiple PANs.

In some implementations, if the master device determines that all of the default slave devices have established Bluetooth connections with the master device (606), then the master device, in some examples, may determine a number of available slave device slots within the PAN or scatternet (610). For example, if there are five default slave devices that are all connected to the default master device, then there are two available slave device slots that may be able to be filled by additional Bluetooth-enabled LRUs. However, if all of the default slaves have not connected to the master device, then in some examples, the master device may attempt to establish Bluetooth connections with secondary default slave devices. For example, with respect to the system 100 (FIG. 1), the PSU 118 may serve as a secondary default slave device for the SCM 102, the SCU 120 may serve as a secondary slave device for the IOM 106, and the air pump 122 may serve as a secondary slave device for the IOM 110. Because the default slave devices are connected to their corresponding secondary slave devices by hardwired data cables, the secondary slave devices can communicate any data messages to the default slave devices in cases where the Bluetooth communication devices in the slave devices may have malfunctioned or failed.

Based on the number of available slave slots in the PAN, in some implementations, the master device may determine if there are any additional devices within communication range of the PAN that are available to communicate with the devices within the PAN (612). In some implementations, the master device may determine that another Bluetooth-enabled device is available to become a part of the PAN based on a communication request received from the other device. If there are any additional devices to connect to the PAN and there are available slave device slots available in the PAN (614) to accommodate all of the additional devices, in some examples, the master device connects the additional devices to the PAN in the available slave slots (616).

If, however, there are not available slave slots available in the PAN to accommodate all of the additional devices, then in some implementations, the master device expands the PAN into a scatternet having two or more connected PANs so that greater than eight devices can communicate simultaneously. In some implementations, the master device determines a scatternet grouping scheme for organizing the devices into the PANs that make up the scatternet (618).

For example, the scatternet grouping scheme may be a time of connection grouping scheme, a physical location grouping scheme, a frequency interference grouping scheme, or a LRU function grouping scheme. In some examples, with the time of connection grouping scheme, the devices are grouped into PANs based on an order in which the slave devices established connection with the master device or requested to establish a connection with the master device. With a physical location grouping scheme, the devices may be organized based on a physical location of the devices within the scatternet. For example, aircraft seat actuators located in or in close proximity to a seat back (e.g., recline actuator, armrest actuators, air pump actuators) may be organized into one PAN of the scatternet while aircraft seat actuators located in close proximity to a seat (e.g., seat pan actuators, translation actuators, footrest actuators) may be organized into another PAN of the scatternet.

With a frequency interference grouping scheme, the PANs may be organized based on frequency interference between the LRUs of one aircraft suite and the LRUs of another aircraft suite. For example, some of the LRUs within the scatternet may experience interference with LRUs of another aircraft suite or other Bluetooth devices within the aircraft based on frequency hopping schemes of the other devices, locations of the devices relative to the LRUs, and the like. The LRUs that experience the frequency interference may be organized into a separate PAN with a frequency hopping scheme that is not affected by the previously experienced interference. Also, the LRUs of the system may be organized into PANs within a scatternet based on the type of function associated with the LRUs. For example, seat actuators and their associated IOMs may be organized into one PAN while lighting LRUs and their associated IOMs may be organized into another PAN.

Once the LRUs that make up each of the PANs within the scatternet have been identified, in some implementations, the parking devices that connect the PANs of the scatternet are identified (620). In some implementations, the master device selects the parking device as any one of the LRUs in the system that is configured with an ECU as part of the device. In one example, one of the IOMs in an aircraft suite actuation system is assigned as a parking device, but any of the seat actuators, lighting modules, or any other Bluetooth-enabled device in the system can be assigned as the parking device. In some implementations, the default master device controls connecting the Bluetooth-enabled LRUs within the scatternet in accordance with the identified grouping scheme and with the identified parking devices acting as bridges between the PANs of the scatternet.

Figure 7A:
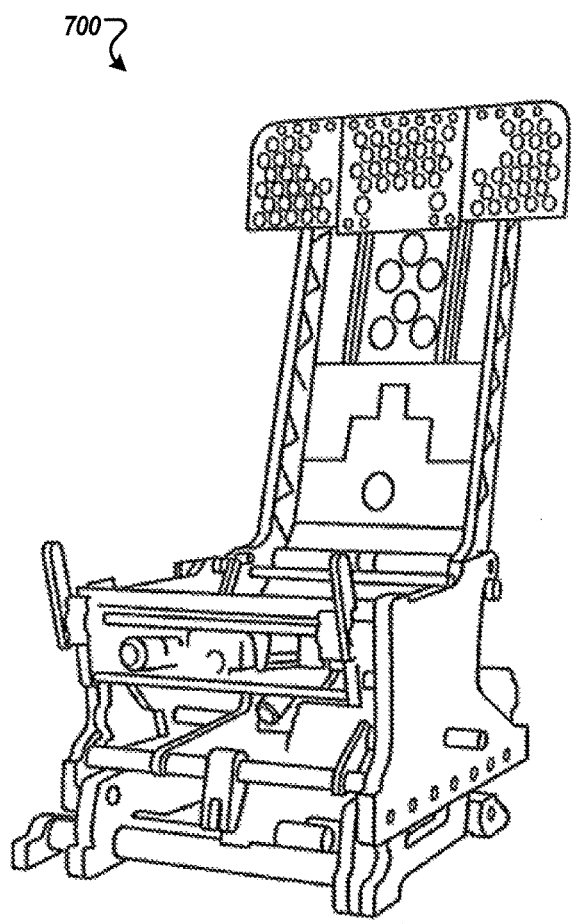
FIG. 7A illustrates an exemplary aircraft seat in which the Bluetooth-enabled LRUs are installed.

FIGS. 7A-7K illustrate exemplary views of actuators installed in aircraft seat 700. FIG. 7A broadly illustrates the mechanical elements of the passenger seat 700 incorporating various types of Bluetooth-enabled LRUs and other devices described herein. For example, the aircraft seat actuators described in FIGS. 7B-7K can be included as part of the system 100 (FIG. 1) where each of the actuators includes a Bluetooth-enabled LRU.

Figure 7B:
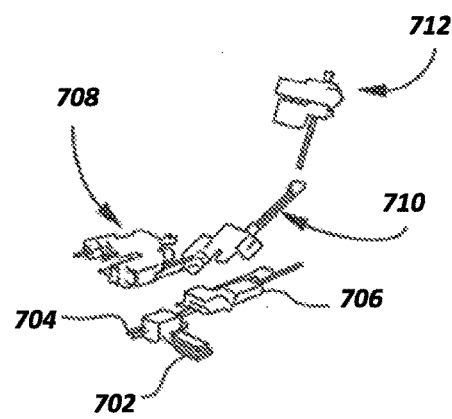

FIG. 7B illustrates various electromechanical actuators configured to cause passenger-initiated movement of the passenger seat 700 and their relative positions in relation to the seat 700, namely, a seat pan extension actuator 702, leg rest actuator 704, and translation actuator 706 in position on a lower seat frame, as well as an armrest actuator 708 and a headrest actuator 712. Each of the actuators is configured with a Bluetooth-enabled LRU that controls passenger-initiated movement of the aircraft seat 700. The LRUs for each of the actuators can exchange data via Bluetooth PAN and/or scatternet connections such that the actuators are only connected by 2-wire power cables, which reduces an overall weight and wiring complexity of the aircraft seat 700.

Figure 7C:
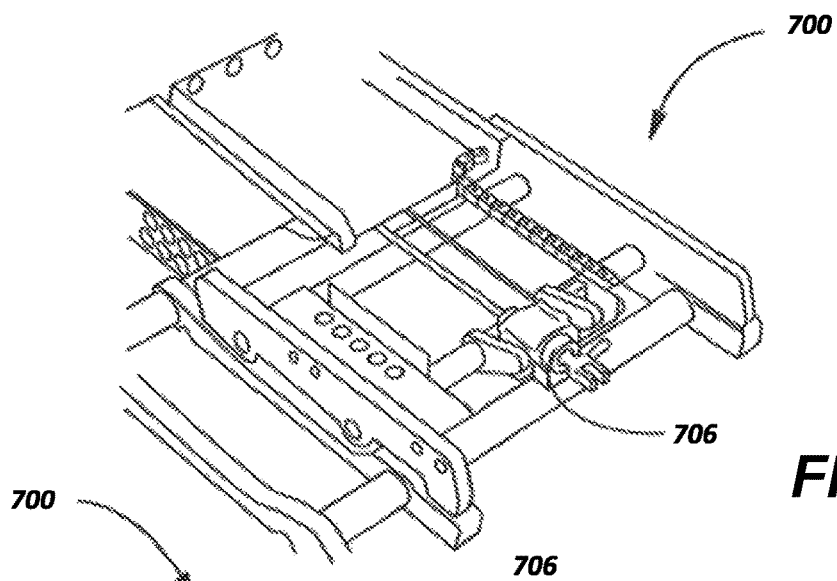
Figure 7D:
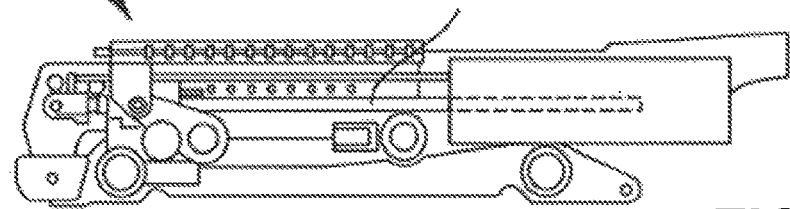
Figure 7E:
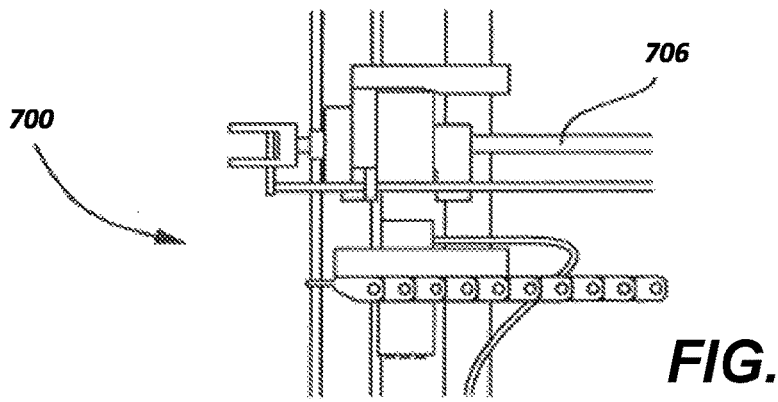

FIGS. 7C-7E illustrate various views of the translation actuator 706 configured on the lower seat frame of the passenger seat 700. In some implementations, the translation actuator 706 causes the lower seat frame to translate horizontally when the aircraft seat 700 moves between upright TTOL and lie flat positions. For example, when moving from an upright position to a lie flat position, the translation actuator 706 moves the lower seat frame in a forward direction. When moving from the lie flat position to the upright position, the translation actuator 706 moves the lower seat frame in a rearward direction.

Figure 7F:
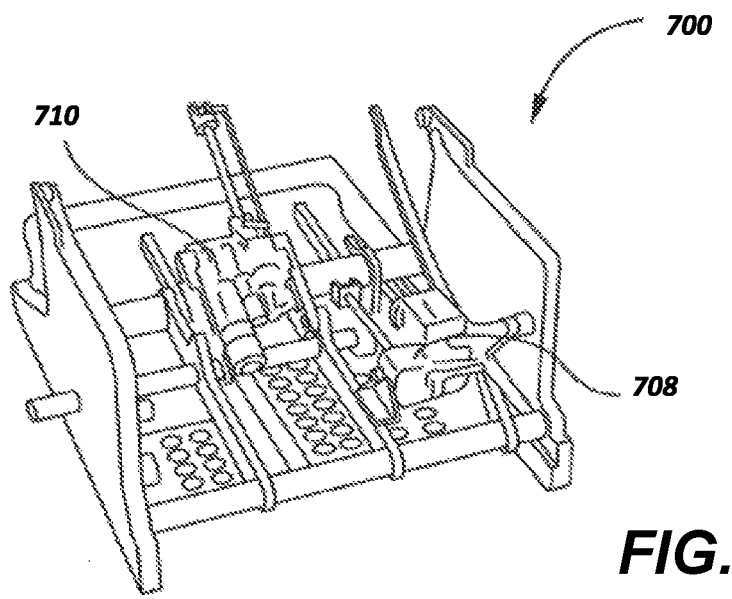
Figure 7G:
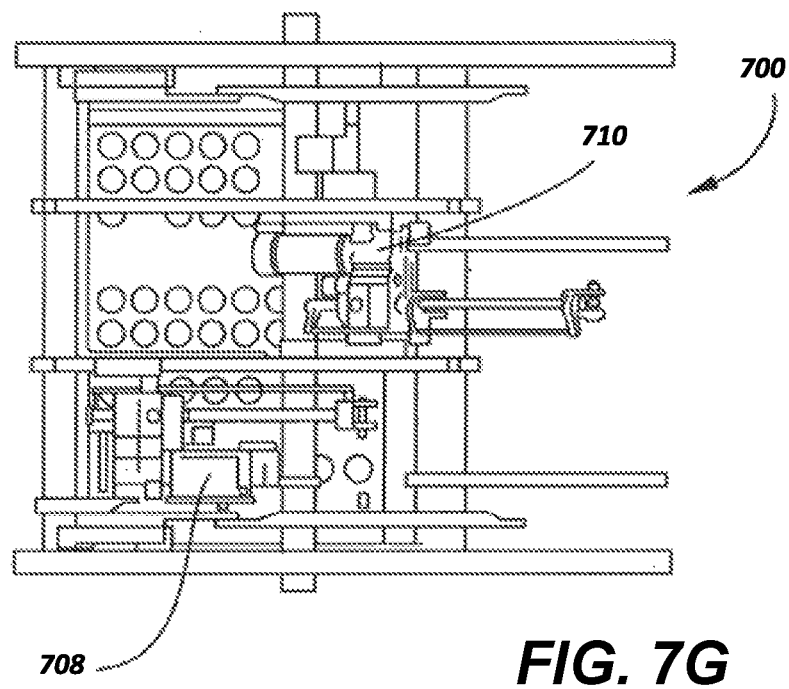

Turning to FIGS. 7F and 7G, various views of the recline actuator 710 and an armrest actuator 708 are illustrated. As shown in FIGS. 7F-7G, the recline actuator 710 functions to move the seat back of the seat 700 between the full upright and lie flat positions, including intermediate comfort positions in coordination with horizontal movement of the seat pan and lower seat frame. For example, when the aircraft seat reclines, the seat pan moves in a forward direction while the recline actuator 710 moves the seat back to recline. A single armrest actuator 708 in the lower seat frame can simultaneously operate left and right armrests between upper and lower positions.

FIGS. 7H and 7I provide views of a lower seat frame of the aircraft seat 700 including leg rest actuator 704 and seat pan actuator 702. FIG. 7H is a perspective view, looking upward at the lower seat frame, of the seat pan extension actuator 702 and the leg rest actuator 704 in position on the lower seat frame, and FIG. 7I is a side view of the seat pan extension actuator 702 and leg rest actuator 704 in the lower seat frame. In some implementations, the seat pan extension actuator 702 and the leg rest actuator 704 operate to translate the seat pan and leg rest in a forward direction during translation of the seat 700 into the lie flat position and operate to translate the seat pan and leg rest in a rearward direction during translation of the seat 700 into the upright position, as well as to intermediate positions between the upright and lie flat positions.

Figure 7J:
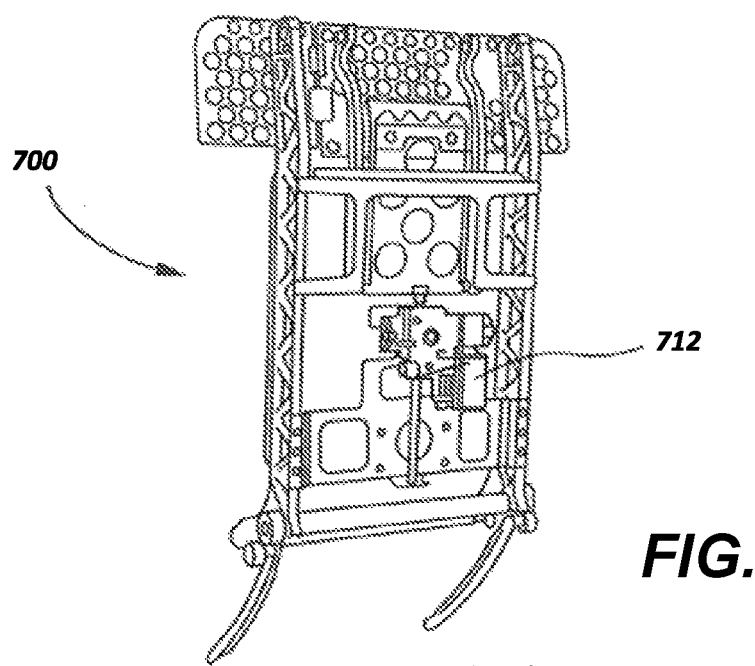
Figure 7K:
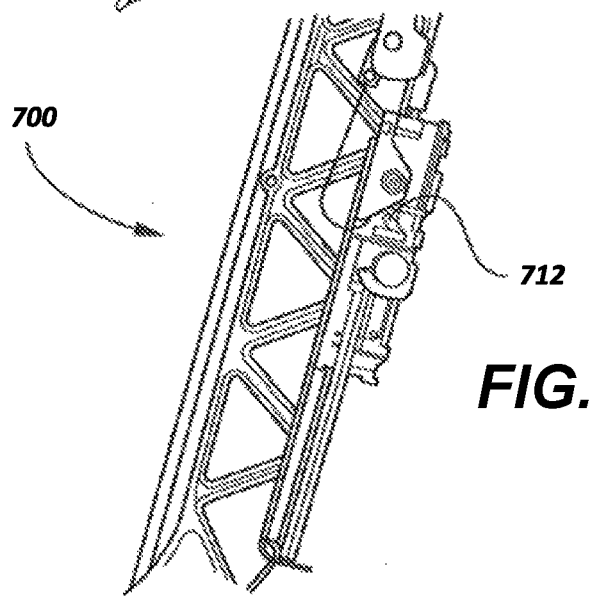

FIGS. 7J and 7K illustrate the position of the headrest actuator 80 on the seat back of the aircraft seat 700. In some implementations, the headrest actuator 80 controls upward and downward motion of an aircraft seat headrest in response to passenger input at a SCU. Of course, the passenger suite control system described herein can be used with other adjustable seats and movable passenger accoutrements, and is not limited to use with the specific seat 700 described herein.

In some implementations, seat 700 may be designed to have a TTOL position with 4° of seat pan angle, 15° of back upright angle, and 46 cm bottom cushion height at front edge from top of floor/pallet with a privacy divider in any position. The seat 700 may be provided with a separate control for the dining position for added ease in achieving the dining position, which may have 10° of back angle and 4° of seat pan angle. In a lounge position, the seat back recline angle is 50° from upright with a seat pan rotation of 12°. In a bed position, the seat back recline angle is −3° as a result of a nose down orientation.

In some examples, a separate seat comfort position may also be provided on a seat control unit, which may include a lumbar system with an air pump that can control an amount of air supplied to a pneumatic bladder system that provides seat back lumbar support in response to a passenger IOM. This feature may be considered a comfort adjustment and is not typically changed by selecting a preset position such that the passenger-specified comfort setting may be maintained as the aircraft seat moves between various positions (e.g., TTOL, dining, intermediate reclining, lie flat).

Exceptions to these settings may include the fact that the TTOL position may be subject to company, Federal Aviation Administration (FAA), or other regulatory agency regulation, and the lumbar and seat pan adjustment may vary when moving to the preset lie-flat position. For example, when moving the seat 700 into lie-flat position, an override may cause the lumbar support to automatically deflate and the leg rest to fully deploy. When the seat moves to the TTOL position, the leg rest may fully stow while the seat back and seat bottom are automatically moved to the TTOL position. Other system overrides can include emergency overrides where the seat automatically moves to a TTOL or other egress position in an emergency condition. In addition, the headrest may be programmed to move as required to avoid geometric constraints.

Figure 8:
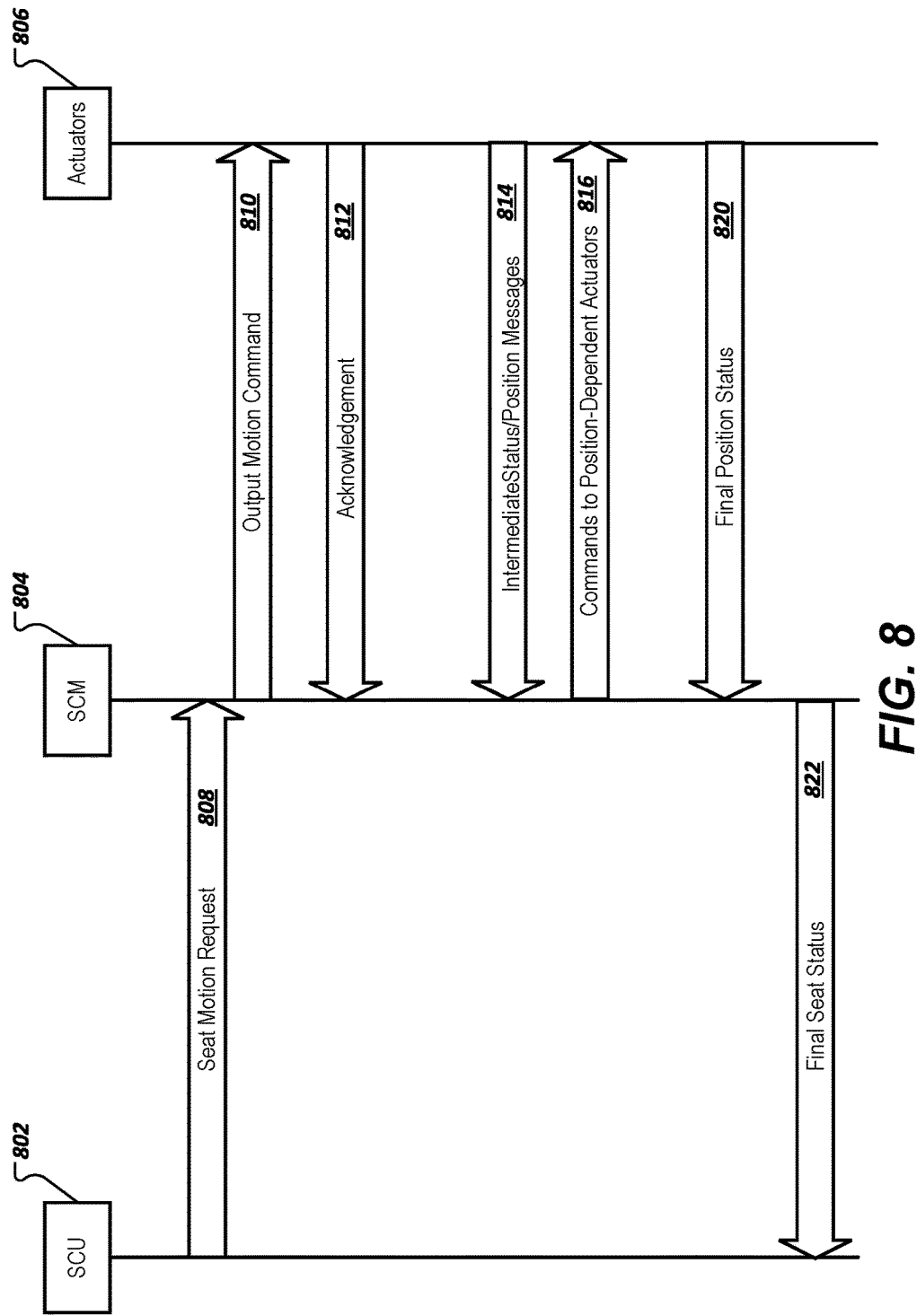
FIG. 8 illustrates a diagram of exemplary messages exchanged between Bluetooth-enabled LRUs coordinating movement of actuated components of an aircraft seat.

In some implementations, each action taken by the actuators of the aircraft seat 700 to move the aircraft seat into a position requested by the passenger at an IOM or by a TTOL, emergency, or other type of override can be governed by Bluetooth messages exchanged between the Bluetooth communication devices installed in the LRUs of the actuators that are connected through PAN or scatternet connections as described above. For example, FIG. 8 is an exemplary diagram of messages exchanged between Bluetooth-enabled LRUs that may include a SCU 802, SCM 804, and various actuators such as those described in FIGS. 7B-7K that coordinate movement of actuated components of aircraft seat 700. In can be understood that the messages exchanged between LRUs connected in a PAN or scatternet may include data messages in accordance with Bluetooth communication standards. The SCU 802, SCM 804, and actuators 806 may be part of a PAN or scatternet where the SCM 804 is a master device, and the LRUs associated with the SCU 802 and actuators 806 are slave devices.

In some implementations, the SCU 802 may be an armrest SCU or a touchscreen SCU on an IFE module where the passenger can input commands to move the aircraft seat 700 between upright TTOL, lie flat, intermediate, and comfort positions. The passenger inputs are transmitted by an IOM associated with the SCU 802 to the SCM via a seat motion request 808 indicating the type of seat motion requested by the passenger (e.g., lie flat to upright, upright to lie flat, etc.). In response to receiving the seat motion request 808, in some implementations, the SCM 804 outputs motion command messages 810 to the actuators 806 to execute the requested movement of the aircraft seat 700. In response to receiving the output motion command 810, in some examples, the actuators 806 may transmit an acknowledgement message to the SCM 804 and begin controlling the actuated components based on the received command message 810. For example, upon actuation to move from the TTOL to lie flat position, the recline actuator 710 and the translation actuator 706 begin their constant travel toward the full lie-flat position.

In some implementations, the movement of some seat actuators is dependent upon the positions of other actuated components of the aircraft seat 700. For example, movement of the leg rest by the leg rest actuator 704 may be based on the position of the seat pan extension actuator 702 and/or the translation actuator 706. Throughout the movement of the aircraft seat 700 between the TTOL and lie flat positions, the actuators 814 may transmit intermediate position status messages 814 to the SCM 804, which in turn transmits intermediate commands to position-dependent actuators 820 informing the position-dependent actuators when one or more actuators have reached predetermined locations that correspond to movement of the position-dependent actuators. For example, in the case of the leg rest actuator 704, the SCM 804 may transmit position information regarding the seat pan extension actuator 702 and/or translation actuator 706 to the leg rest actuator 704 so that as soon as practical, the leg rest begins its deployment in order to avoid contact with the floor, and the seat pan extension is able to fully extend in the forward direction toward the lie flat position. As the seat 700 approaches the lie flat position, the headrest is also moved by the headrest actuator 712 to avoid any collisions with the suite structure. Similar messaging may occur between the SCU 802, SCM 804, and actuators 806 as the aircraft seat 700 moves from the lie flat to the TTOL position. For example, upon actuation, the recline actuator 710, translation actuator 706, and leg rest actuator 704 begin their travel to the TTOL position. Leg rest travel may be interrupted to facilitate stowage without contacting stay out zones. In some implementations, the actuators 806 for each of the actuated components may transmit final position status messages 820 to the SCM 804 indicating that the associated actuated component has reached a final position associated with the seat motion request 808. In response to receiving the final position status messages 820 from the LRUs for all of the actuators of the aircraft seat, in some implementations, the SCM 804 transmits a final seat status message 822 to the SCM 802, which can in turn be indicated to the passenger at the SCU 802 via a display, flashing light, audible tone, etc.

Figure 9:
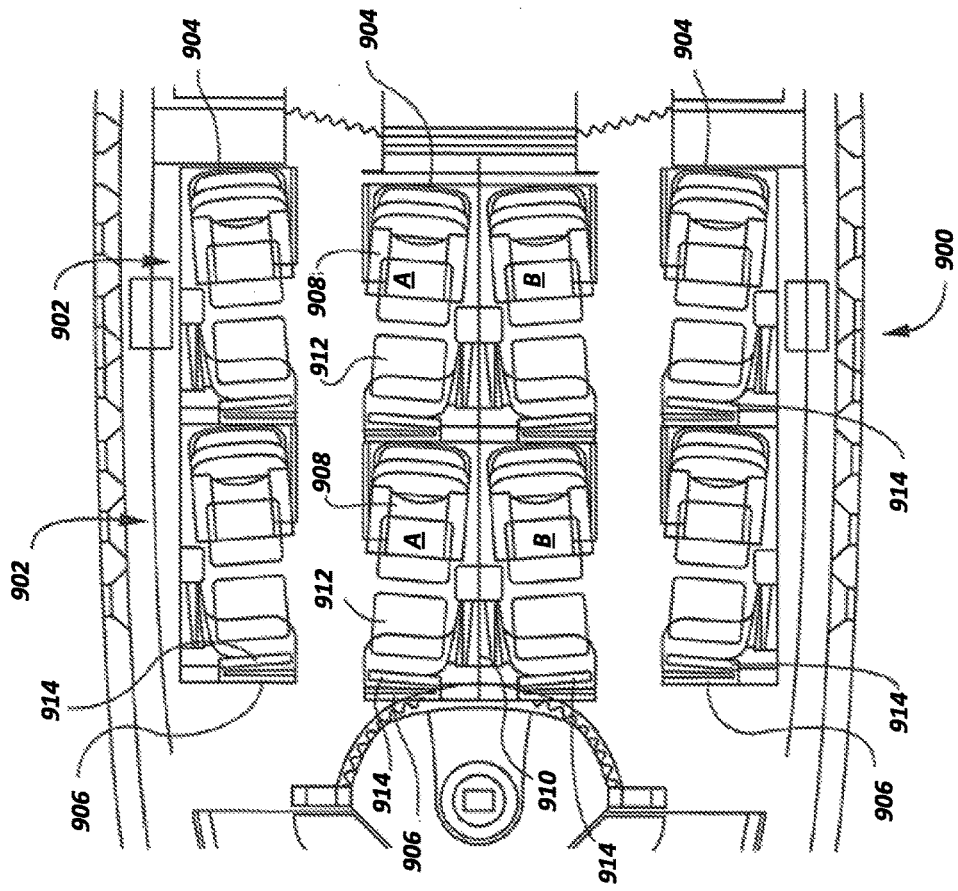
FIG. 9 illustrates a top plan layout view of a premium class aircraft passenger compartment showing an array of aircraft suites.

Turning to FIG. 9, a top plan layout view of a premium class aircraft passenger compartment 900 showing an array of aircraft suites is illustrated. As shown in FIG. 9, a passenger suite 902 includes a rear panel 904, a front panel 906, a seat 908 shown in its upright, TTOL position, a privacy panel 910 between adjacent suites 902, an ottoman (leg rest) 912, a video monitor 914, and other passenger comfort features and structures. The seat 908 and ottoman 912 may be mounted by appropriate fittings to tracks or other fastener elements on or in the aircraft deck.

In some implementations, the privacy panel 910 shown in FIG. 9 may include a Bluetooth-enabled LRU that is controlled by a SCM via a SCU according to the embodiments described above. Center privacy dividers (up/down) like the privacy divider 910 may be installed only on center passenger seat suites where adjacent suites 902 are not separated by an aisle. Aisle-side flexible privacy panels (down/up) may also electrically actuated and controlled by the SCM via the SCU. A mechanical override control is discreetly located within the suite 902 to allow stowage should override become necessary, such as in emergency egress situations. Control of the center privacy panel 910 is provided to both center passengers through the SCM for each of the suites 902.

In some implementations, the privacy panel 910 is attached to a lift mechanism and between the suite 902 side walls and moves into a fully extended (upward) position as a result of the privacy panel 910 lift mechanism being raised. In one example, a privacy panel actuator may have four turns (with the selected pinion gear) to achieve stroke of 47 centimeters (cm) for the privacy panel 910 mechanism. The time for the privacy panel 910 to move from a fully lowered position to a fully extended position may be approximately four seconds. With an open concept suite design and without overhead bins in the first class cabin, a handhold every 165 cm at the height of 84 cm is required. Therefore, one of the privacy panels 910 may be required to be at the 84 cm level to meet this handhold requirement. In addition, the privacy panel 910 is capable of being used even in the event of actuator or electrical failure.

Figure 10:
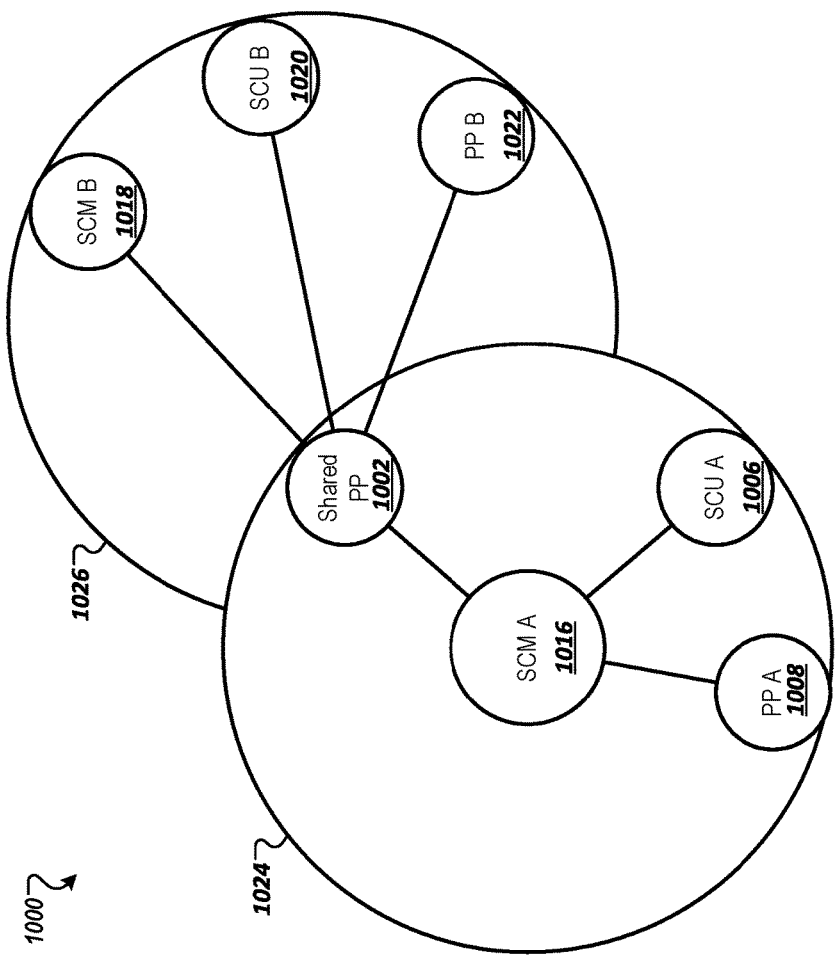
FIG. 10 illustrates an exemplary diagram of a scatternet for coordinating shared privacy panel movement between aircraft suites.

Privacy panel sequencing may be implemented to accommodate the choices of the two passengers (Passenger A in Suite A and Passenger B in Suite B) sitting in aircraft suites 902 on opposite sides of the privacy panel 910. In some implementations, the privacy panel actuator LRUs for shared and aisle-side privacy panel actuators along with SCUs and SCMs for Suites A and B can be included as part of a scatternet that coordinates movement of the shared privacy panel 910 between Passenger A and Passenger B. For example, FIG. 10 illustrates an exemplary scatternet 1000 for coordinating shared privacy panel movement between aircraft suites A and B. The scatternet 1000 may include PANs 1024 and 1026 that each include LRUs associated with components of aircraft suites A and B. For example, PAN 1024 may include LRUs for suite A such as SCM A 1016, SCU A 1006, and aisle-side privacy panel (PP) A 1008. Similarly, PAN 1026 may include LRUs for suite B such as SCM B 1018, SCU B 1020, and aisle-side privacy panel (PP) B 1022. In some examples, the LRU for shared privacy panel (PP) 1002 is the bridge device connecting the two PANs 1024 and 1026 within the scatternet 1000.

In some implementations, operation of the scatternet 1000 is based on which aircraft suite A or B has control over the shared privacy panel 1002. For example, when neither passenger A or B is attempting to manipulate the shared privacy panel 1002, the LRU for each SCM 1016 and 1018 within the PANs 1024 and 1026 functions as the master device while the LRU for the shared privacy panel 1002 operates as a slave device in each of the PANs 1024 and 1026 while also performing the functions of the bridge device. When one of the passengers A or B is manipulating the shared privacy panel 1002, the LRU for the shared privacy panel 1002 may become the master device of the PAN associated with the passenger that is not manipulating the shared privacy panel 1002 so that the other passenger cannot manipulate the shared privacy panel 1002 while motion is in progress. For example, if passenger A is manipulating the shared privacy panel 1002, then the LRU for the shared privacy panel 1002 may become the master device of the PAN 1026 while passenger A is controlling the shared privacy panel 1002 in order to prevent passenger B from outputting a conflicting privacy panel motion request while the shared privacy panel 1002 is moving at the request of passenger A.

For example, Passenger A may select either from an "UP" or "DOWN" icon for the shared privacy panel 910 on the SCU A 1006, and in response the SCU A may transmit a shared privacy panel motion request to the SCM A 1016 for Suite A. In response, the ECU associated with the SCM A 1016 may command the actuator for the shared privacy panel 910 to move in the appropriate direction. The SCM A 1016 may also send out a digital signal to the other LRUs within the scatternet 1000 reporting the status of the command output by the SCU A 1016. In some implementations, the LRU for SCM A 1016 communicates to SCU B 1020 of Passenger B via the LRU for the shared PP 1002 that the motion is being commanded. Therefore, when Passenger B selects to move the shared privacy panel 1002 while motion commanded by the SCM A 1016 is in progress, the signal is transmitted to the SCM B 1018 requesting the motion, but the request will be denied while motion of the shared privacy panel 1002 is in progress. In some implementations, the first passenger to initiate the shared privacy divider motion has control of the shared privacy panel 1002 as long as the button on the respective seat control is depressed or other type of seat control input is activated. When the seat control button is released, the other passenger can control the shared privacy panel 1002 as desired. In some examples, there may be no lockout or other deductive-logic. The first passenger, whether Passenger A or B, to initiate motion for the shared privacy panel 1002 has control of the shared privacy panel 1002 as long as the seat control button is depressed.

The embodiments described above offer multiple advantages not present in aircraft suite electromechanical actuation systems. For example, because the aircraft suite actuators include Bluetooth-enabled LRUs, the need for hardwired data cables is replaced due to the wireless communication networks that can be established between the LRUs to communicate commands to adjust a position of an aircraft seat or other suite component in response to a passenger request. Therefore, by eliminating much of the previously relied upon data cabling for communication between LRUs, aircraft suite weight restrictions have less of an impact on the number and type of aircraft suite automation capabilities that can be offered to passengers. In addition, by organizing the Bluetooth-enabled LRUs into PANs that can be expanded into scatternets based on functional characteristics and other properties of the actuators, shared components between passengers, location of the actuators within the aircraft compartment, frequency interference between the LRUs, and time of connection of the LRUs to the wireless communication network, the electromechanical actuation system becomes highly adaptable to changing conditions within the aircraft suite as well as within the aircraft cabin as a whole. Also, the wireless communication network connecting the Bluetooth-enabled LRUs improves the ability to diagnose problems with the components of the electromechanical actuation system due to the ease of transmitting data messages to a diagnostic system via the wireless communication link.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An electromechanical actuation system for an aircraft passenger suite comprising:
   a plurality of aircraft suite actuators for allowing passenger-initiated adjustment of a passenger seat and one or more passenger suite components; and
   a plurality of line replacement units, including a respective line replacement unit of the plurality of line replacement units coupled to each of the plurality of aircraft suite actuators, the line replacement units including
      control circuitry configured to
         receive a passenger-initiated adjustment request for adjusting at least one of the passenger seat and the one or more passenger suite components, and
         control actuation of one or more associated aircraft suite actuator of the plurality of aircraft suite actuators in response to the passenger-initiated adjustment request, and
      wireless communication circuitry configured to
         initiate wireless communication links with one or more line replacement units coupled to each of the plurality of aircraft suite actuators to create a wireless communication network connecting the plurality of line replacement units,
         establish master or slave relationships with the plurality of replacement units based on at least one of properties of the wireless communication links and properties of aircraft suite actuators coupled to the plurality of replacement units, and
         communicate actuation commands from the control circuitry between the plurality of line replacement units via the wireless communication links corresponding to the passenger-initiated adjustment request.

2. The electromechanical actuation system of claim 1, wherein:
   the one or more passenger suite components comprise at least one shared component configured for control by two passengers of two adjacent passenger suites; and
   establishing master or slave relationships with the plurality of line replacement units comprises establishing an associated line replacement unit of the plurality of replacement units associated with the at least one shared component as a master line replacement unit of a first suite of the two adjacent passenger suites such that, when a first passenger of the two passengers issues a command for actuating the at least one shared component, a second passenger of the two passengers is unable to issue a conflicting command.

3. The electromechanical actuation system of claim 2, wherein establishing the associated line replacement unit as the master line replacement unit comprises establishing the associated line replacement unit as the master line replacement unit responsive to receiving the command for actuating the at least one shared component.

4. The electromechanical actuation system of claim 2, wherein the at least one shared component comprises a shared privacy panel.

5. The electromechanical actuation system of claim 1, wherein:
   the plurality of aircraft suite actuators comprises a seat reclining actuator, a seat pan actuator, and a foot rest actuator;

the passenger-initiated adjustment request comprises a preset seating position; and
responsive to the passenger-initiated adjustment request, the control circuitry controls actuation of the seat reclining actuator, the seat pan actuator, and the foot rest actuator to move the passenger seat into the preset seating position.

6. The electromechanical actuation system of claim 5, wherein the control circuitry is further configured to:
receive an emergency override; and
responsive to the emergency override, control actuation of the seat reclining actuator, the seat pan actuator, and the foot rest actuator to move the passenger seat into a taxi takeoff and landing (TTOL) position.

7. The electromechanical actuation system of claim 1, wherein the wireless communication network is a Bluetooth Personal Area Network.

8. The electromechanical actuation system of claim 1, wherein establishing master or slave relationships with the plurality of line replacement units comprises establishing a plurality of localized networks into a scatternet by connecting, by one or more line replacement units of the plurality of line replacement units, the plurality of localized networks.

9. The electromechanical actuation system of claim 8, wherein:
establishing master or slave relationships with the plurality of line replacement units comprises establishing at least one line replacement unit of the plurality of line replacement units as a seat control module; and
controlling actuation of the at least one aircraft suite actuator of the plurality of aircraft suite actuators comprises coordinating actuation, by the seat control module, of two or more aircraft suite actuators of the plurality of aircraft suite actuators.

10. The electromechanical actuation system of claim 9, wherein coordinating actuation comprises:
receiving an intermediate status message from a first actuator of the two or more aircraft suite actuators; and
responsive to the intermediate status message, communicating information regarding the intermediate status message to a second actuator of the two or more aircraft suite actuators;
wherein actuation of the second actuator depends upon a position of the first actuator.

11. The electromechanical actuation system of claim 1, wherein the properties of the wireless communication links comprise at least one of frequency of interference and time of connection to the wireless communication network.

12. The electromechanical actuation system of claim 1, wherein the properties of aircraft suite actuators comprise at least one of location within an aircraft compartment and shared status with multiple passengers.

13. An electromechanical actuation system for passenger-initiated adjustment of a plurality of aircraft components, the electromechanical actuation system comprising:
a plurality of actuators for allowing passenger-initiated adjustment of the plurality of aircraft components, wherein the plurality of aircraft components comprise at least one of a passenger seat, a lighting fixture, and a suite partition;
a plurality of control units, each control unit including
short range wireless communication circuitry for communicating with additional control units of the plurality of control units, and
control circuitry for causing actuation of one or more associated actuators of the plurality of aircraft suite actuators,
wherein a first control unit of the plurality of control units comprises a user interface for receiving a plurality of passenger input commands;
wherein the control circuitry of the first control unit is configured to
initiate wireless communication links with a first portion of the plurality of control units to establish a short-range wireless communication network, wherein a second portion of the plurality of control units is in communication with the first control unit via a bridge unit of the second portion of the plurality of control units,
receive a passenger input command of the plurality of passenger input commands,
communicate, responsive to the passenger input command, one or more actuation commands to one or more control units of the first portion of the plurality of control units via the wireless communication links, and
receive, from at least one of the one or more control units, one or more status/position messages communicating information regarding movement of corresponding actuators of the plurality of actuators caused by the at least one control unit.

14. The electromechanical actuation system of claim 13, wherein the one or more status/position messages comprise a message identifying movement to a predetermined position corresponding to the passenger input command.

15. The electromechanical actuation system of claim 13, wherein the user interface comprises at least one seat control button.

16. The electromechanical actuation system of claim 13, wherein the first control unit comprises an in-flight entertainment module, wherein the user interface is presented via a touch screen interface of the in-flight entertainment module.

17. The s electromechanical actuation system of claim 13, further comprising a power supply unit, wherein each control unit of the first portion of the plurality of control units is wired to and receives power from the power supply unit.

18. The electromechanical actuation system of claim 13, wherein the first control unit is further configured to receive status messages from a remainder of the first portion of the plurality of control units and to communicate at least one of an error and a malfunction to an aircraft diagnostic system.

19. The electromechanical actuation system of claim 13, wherein the control circuitry of the first portion of the plurality of control units is configured to establish master/slave relationships among the first portion of the plurality of control units based on at least one of properties of the wireless communication links and properties of actuators coupled to the plurality of control units.

20. The electromechanical actuation system of claim 13, wherein the first portion of the plurality of control units is automatically separated from the second portion of the plurality of control units upon establishing a threshold number of wireless communication links among the first portion of the plurality of control units.

* * * * *